United States Patent
Yang et al.

(10) Patent No.: US 10,473,333 B2
(45) Date of Patent: Nov. 12, 2019

(54) VORTEX GENERATING ARRANGEMENT FOR A PRE-MIXING BURNER OF A GAS TURBINE AND GAS TURBINE WITH SUCH VORTEX GENERATING ARRANGEMENT

(71) Applicant: ANSALDO ENERGIA SWITZERLAND AG, Baden (CH)

(72) Inventors: Yang Yang, Nussbaumen (CH); Michael Düsing, Rheinfelden (CH)

(73) Assignee: ANSALDO ENERGIA SWITZERLAND AG, Baden (CH)

(*) Notice: Subject to any disclaimer, the term of this patent is extended or adjusted under 35 U.S.C. 154(b) by 543 days.

(21) Appl. No.: 15/098,009

(22) Filed: Apr. 13, 2016

(65) Prior Publication Data
US 2016/0298849 A1    Oct. 13, 2016

(30) Foreign Application Priority Data

Apr. 13, 2015  (EP) .................................... 15163379

(51) Int. Cl.
  *F23R 3/28* (2006.01)
  *F23R 3/12* (2006.01)
  *F23R 3/18* (2006.01)

(52) U.S. Cl.
  CPC ............. *F23R 3/286* (2013.01); *F23R 3/12* (2013.01); *F23R 3/18* (2013.01); *F23R 2900/03341* (2013.01); *Y02T 50/675* (2013.01)

(58) Field of Classification Search
  CPC ...... F23R 3/12; F23R 3/14; F23R 3/18; F23R 3/286
  See application file for complete search history.

(56) References Cited

U.S. PATENT DOCUMENTS

| 5,609,030 A | 3/1997 | Althaus |
|---|---|---|
| 6,189,320 B1 | 2/2001 | Poeschl et al. |

(Continued)

FOREIGN PATENT DOCUMENTS

| DE | 103 30 023 A1 | 2/2004 |
|---|---|---|
| EP | 2 725 302 A1 | 4/2014 |
| WO | WO/0019081 A2 | 4/2000 |

OTHER PUBLICATIONS

Office Action (Communication pursuant to Article 94(3) EPC) dated Mar. 22, 2018, by the European Patent Office in corresponding European Patent Application No. 15 163 379.9-1009. (5 pages).

(Continued)

*Primary Examiner* — Arun Goyal
(74) *Attorney, Agent, or Firm* — Buchanan Ingersoll & Rooney PC (57) ABSTRACT

The invention proposes a vortex generating arrangement, especially for a pre-mixing burner of a gas turbine, having an air conducting channel of predetermined height extending between two essentially parallel channel walls and having a predetermined direction of air flow, and having a plurality of vortex generators arranged in the channel. An improved mixing is achieved by the vortex generators each having the shape of a triangular plate, which is arranged essentially perpendicular to the channel walls and oriented relative to the direction of air flow with a predetermined off-axis angle ≠0°, and a first side of the triangular plate being oriented perpendicular to the channel walls.

15 Claims, 10 Drawing Sheets

(56) References Cited

U.S. PATENT DOCUMENTS

| | | |
|---|---|---|
| 6,263,660 B1 | 7/2001 | Lawlor |
| 7,237,384 B2 | 7/2007 | Stuttaford et al. |
| 7,513,098 B2 * | 4/2009 | Ohri .......................... F23R 3/14 |
| | | 60/39.11 |
| 8,453,454 B2 * | 6/2013 | Lacy ....................... F23R 3/286 |
| | | 60/740 |
| 2004/0037162 A1 | 2/2004 | Flohr et al. |
| 2008/0016876 A1 * | 1/2008 | Colibaba-Evulet ....... F02C 9/40 |
| | | 60/776 |
| 2009/0019855 A1 | 1/2009 | Venkataraman et al. |
| 2014/0318150 A1 * | 10/2014 | Metternich ............. F23R 3/002 |
| | | 60/798 |

OTHER PUBLICATIONS

Extended European Search Report dated Oct. 2, 2015, by the European Patent Office in European Patent Application No. 15163379.9 (8 pages).
Office Action (Communication pursuant to Article 94(3) EPC) dated Feb. 25, 2019 in corresponding European Patent Application No. 15 163 379.9.
First Office Action dated Apr. 1, 2019 in corresponding Chinese Patent Application No. 201610226376.3, and an English translation thereof.

* cited by examiner

VORTEX GENERATING ARRANGEMENT FOR A PRE-MIXING BURNER OF A GAS TURBINE AND GAS TURBINE WITH SUCH VORTEX GENERATING ARRANGEMENT

BACKGROUND OF THE INVENTION

The present invention relates to the technology of gas turbines and to a vortex generating arrangement.

PRIOR ART

Figure 1:
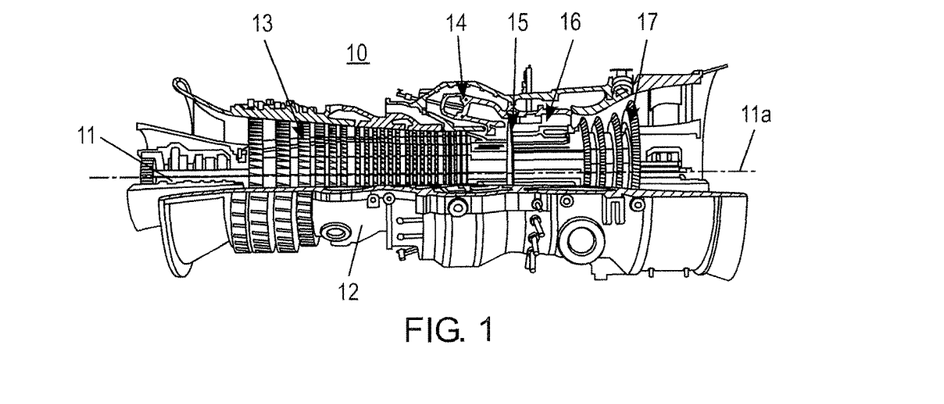
FIG. 1 shows a longitudinal section of a gas turbine of the type GT26 with sequential combustion.

FIG. 1 shows as an example without prejudice a longitudinal section of a gas turbine of the type GT26 with sequential combustion and pre-mixing burners, wherein vortex generators are used to enhance the mixing of air and fuel prior entering the combustion chamber.

The gas turbine 10 of FIG. 1 comprises a rotor 11 rotating about a central machine axis 11a and being concentrically surrounded by a casing 12. A compressor 13 compresses air and supplies a first combustor 14 via a plenum. First combustor 14 generates hot gas by burning a fuel with said compressed air and drives a (first) high-pressure turbine 15. A second combustor 16 downstream of said high-pressure turbine 15 injects a fuel into the hot gas, which still contains air, and reheats said gas to drive a (second) low-pressure turbine 17. Both combustors 14 and 16 are in this case arranged in an annular configuration concentric around machine axis 11a.

The burners used in both combustors 14 and 16 of gas turbine GT26, which are known as EV and SEV burners, are pre-mixing burners, wherein air and fuel are mixed before entering the combustion chamber, where a stable flame sheet is generated. It is further known to provide so-called vortex generators within said burners to enhance pre-mixing. An example of such vortex generators is disclosed in document DE 103 30 023 A1.

On the other hand, the mixing quality for current flame sheet (FS) burners could be further improved.

While there is no such FS burner in type GT26 gas turbines, FS burners could be used as a first (or only) stage in GTs with a can architecture.

Furthermore, the present mixing deficiencies might cause the flame front not to anchor sufficiently.

Current FS burners use swirl shear mixers (see for example document U.S. Pat. No. 7,237,384 B2), which have an injector location at the trailing edge of vane shaped injectors. The fuel is injected into two shear layers of air and mixes with the air.

The referenced document claims that, using longer mixing passage and longer residence time, the mixing quality should be improved. However, the strength of the vortices within the shear layer is low, which means a significant improvement is not achievable with current burner size ands mixing concept.

Vortex generators (VG) have been widely used as separation delay device on aeroplane wing. As explained above, they enhance air-fuel mixing by generating vortices in the SEV burner of gas turbines of type GT26 and GT24.

For a fuel-air mixer/injector in a burner of short height, there are several important issues to be considered:
The injected fuel should mix with gas and achieve certain unmixedness.
There should be low pressure loss and flashback risk, which makes reverse flow in the mixing zone/near channel wall undesirable.
With an improved injector device, passive and optimal control in terms of mixing and low pulsation (due to aerodynamic reason) should be possible.

Current invention aims at using VG-type mixer/injector to meet those three requirements.

SUMMARY OF THE INVENTION

It is an object of the present invention to provide a vortex generating arrangement, especially for a pre-mixing burner of a gas turbine, and a gas turbine, which meet the requirements listed above. This pre-mixing arrangement not necessarily needs to be part of a first stage combustor of a gas turbine. It could as well enhance the pre-mixing in a reheat type of burner.

The vortex generating arrangement according to the invention, especially for a pre-mixing burner of a gas turbine, comprises an air conducting channel of predetermined height extending between two essentially parallel channel walls and having a predetermined direction of air flow, and further comprises a plurality of vortex generators arranged in said channel.

It is characterized in that said vortex generators each have the shape of a triangular plate, which is arranged essentially perpendicular to said channel walls and oriented relative to said direction of air flow with a predetermined off-axis angle $\neq 0°$, and that a first side of said triangular plate is oriented perpendicular to said channel walls.

According to an embodiment of the invention said vortex generators are individually arranged in said channel, and said first side of said triangular plate extends from one to the other of said channel walls.

According to another embodiment of the invention said vortex generators are arranged in said channel in groups, whereby the members of each group are arranged with their first side one after the other in a direction perpendicular to said channel walls.

According to a further embodiment of the invention said first side of said triangular plate is arranged upstream with respect to said direction of air flow, thereby being a leading edge of the respective vortex generator.

According to just another embodiment of the invention said first side of said triangular plate is arranged downstream with respect to said direction of air flow, thereby being a trailing edge of the respective vortex generator.

According to a further embodiment of the invention said vortex generators each have the shape of a right-angled triangular plate, and that said first side is a leg of said right-angled triangle.

According to another embodiment of the invention all vortex generators of said arrangement have the same orientation with respect to said direction of air flow.

Alternatively, the vortex generators of said arrangement have different orientations with respect to said direction of air flow.

Specifically, the vortex generators of said arrangement have two different orientations with respect to said direction of air flow with a positive and negative predetermined off-axis angle.

Even more specifically, vortex generators of different orientations are pair wise combined within said arrangement.

According to another embodiment of the invention a means for injecting a fuel into an air stream passing said vortex generators is provided at said vortex generators.

Specifically, said injecting means is positioned at a specific injector location at said vortex generators.

More specifically, said specific injector location is located at a trailing edge of said vortex generators.

Alternatively, said specific injector location is located at a leading edge of said vortex generators.

The gas turbine according to the invention with a premixing burner comprising a vortex generating arrangement is characterized in that said vortex generating arrangement is an arrangement according to the invention.

BRIEF DESCRIPTION OF THE DRAWINGS

The present invention is now to be explained more closely by means of different embodiments and with reference to the attached drawings.

DETAILED DESCRIPTION OF DIFFERENT EMBODIMENTS OF THE INVENTION

Figure 3:
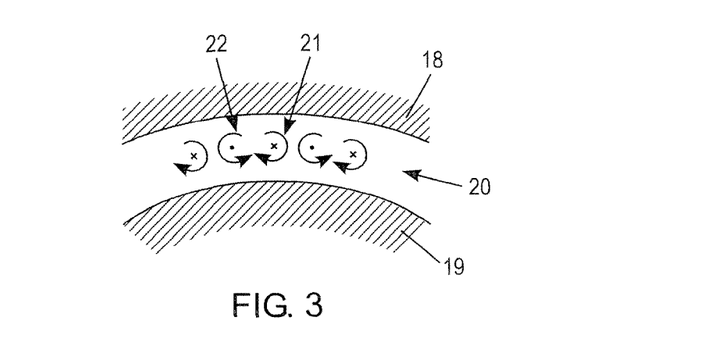
FIG. 3 shows a counter-rotating configuration of vortices with alternating rotational direction.
Figure 4A:
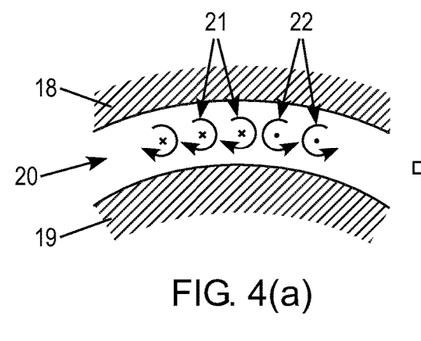
FIG. 4 shows a hybrid configuration with groups of vortices with different rotational direction (FIG. 4(a)), which result in a combined vortex configuration downstream after vorticity field development (FIG. 4(b))
Figure 4B:
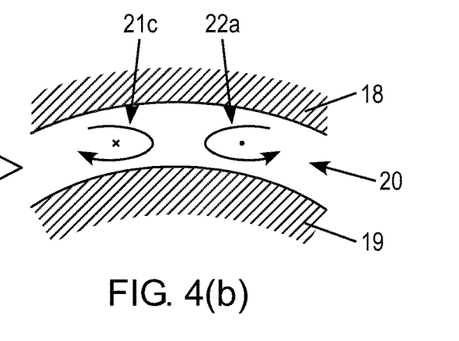

The vorticity field, which is introduced from velocity gradient induced shear layer, is not strong enough to survive in a highly turbulent environment. Therefore, stream wise vorticity is chosen for air-fuel mixing. There are three possible types of vorticity field near one injector, namely a co-rotating, a counter-rotating and a hybrid type, for large scale mixing in current FS injector plane. These types are shown in FIGS. 2, 3 and 4, whereby an annular channel 20 with parallel first and second channel walls 18 and 19 is assumed for the (axial) air flow.

Figures 2A, 2B:
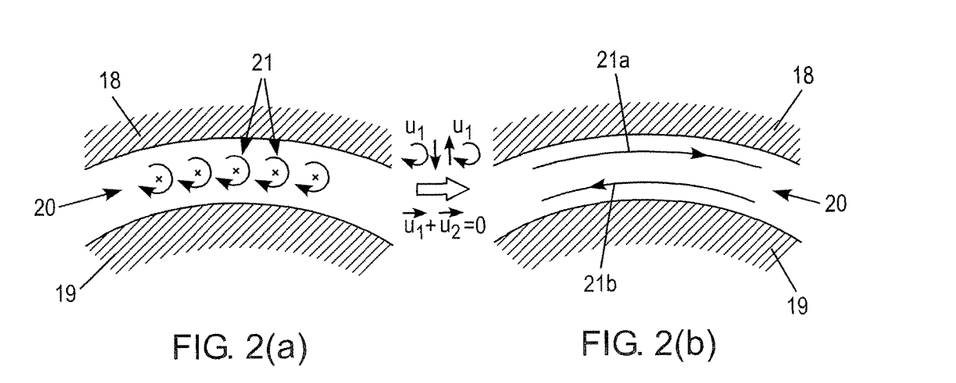
FIG. 2 shows the principles of vortex behavior, starting with a co-rotating configuration of several vortices (FIG. 2(a)), which result in a single swirling flow downstream after vorticity field development (FIG. 2(b))

In co-rotating vorticity configurations (indicated in FIG. 2), the two neighboring vortices 21 are oriented in the same direction (left part of FIG. 2). With superposition of the velocities of neighboring vortices, the separate vortices 21 combine to a single swirling flow 21a and 21b with one overall swirling flow pattern.

In counter-rotating vorticity configurations (FIG. 3), the two neighboring vortices 22a and 22b are oriented in different (opposite) directions so that there is no combination of the vortices. The vortices 22a and 22b dissipate and diffuse downstream. The vortex configuration will exist for some distance before the vortices dissipate.

In hybrid vorticity configurations (FIG. 4) both co-rotating and counter-rotating configurations with vortices 21 and 22 exist so that two neighboring vortices can either combine to vortex 21c or 22a (when the vortices have the same direction) or not (when they have different directions).

In general, to generate a certain vorticity vector and strength $\vec{\Omega}$, it needs a velocity gradient in perpendicular direction to the expected vorticity field $\vec{\Omega}=v\times\vec{U}$. The starting point is either at the discontinuous point of path lines or at the reverse pressure gradient point.

To induce stream wise vortices, vortex generating arrangements with a plurality of vortex generators are used as mixing device.

FIGS. 5 and 6 show various embodiments of vortex generating arrangements according to the invention. It has to be noted that the VGs used in these vortex generating arrangements are different to those within GT24/GT26 SEV burners (see document DE 103 30 023 A1) in order to enable a vortex pattern as shown in FIG. 2 or FIG. 4, respectively. In contrast to those known VGs, where two vortices are generated per VG, only a single vortex is created in the present configuration.

Figure 7A:
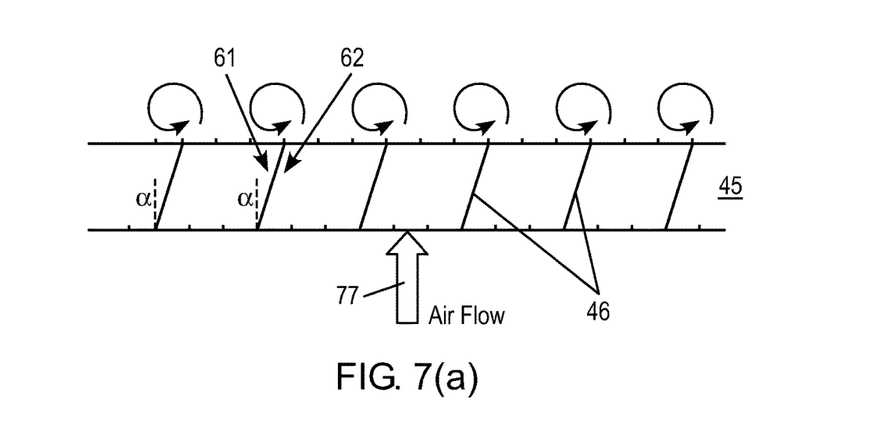
FIG. 7 in a top view a vortex generator arrangement in form of a mixer-injector device set up for co-rotating (FIG. 7(a)), counter-rotating (FIG. 7(b)) and hybrid (FIG. 7(c)) vorticity field.
Figure 7B:
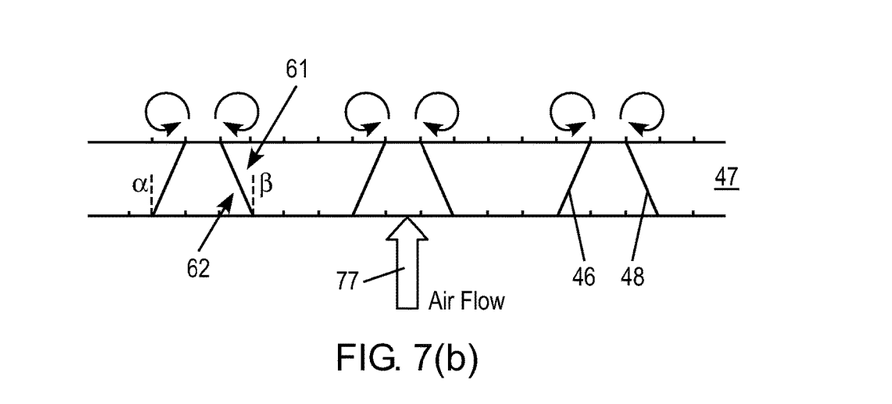

This single vortex is generated at the side edge between a pressure side (62 in FIGS. 7(a) and (b)) and a suction side (61 in FIG. 7(a) and (b)) of the VG. Due to the inclination of the profile relative to the direction of air flow (77 in FIG. 7) the side of the VG facing the approaching flow has an increased pressure level compared to the side of the VG facing the downstream direction of the flow.

Figure 11A:
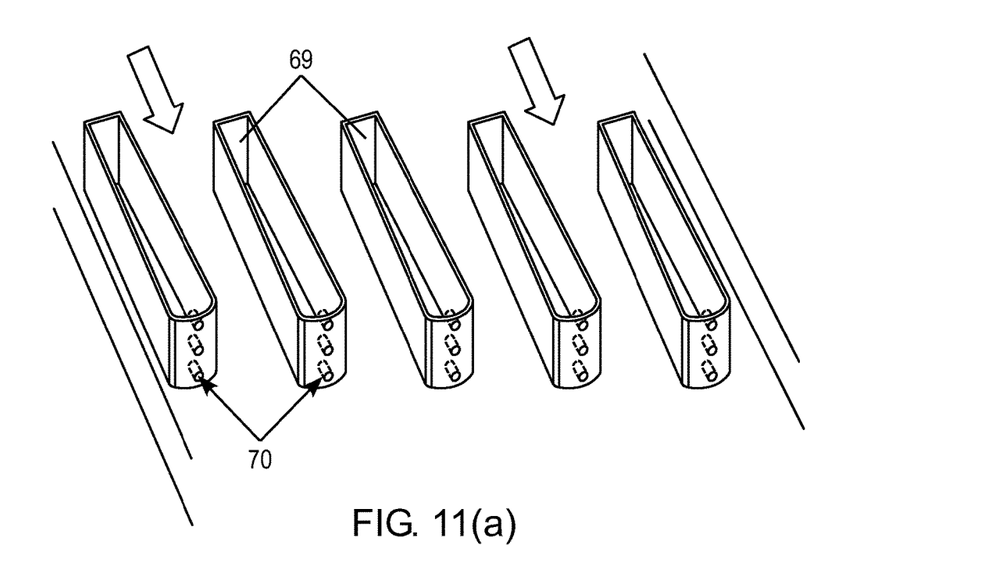
FIG. 11 exemplary geometries for an original flame sheet main injector (a), a half-vane injector according to an embodiment of the invention (b) and a half-vane invert injector according to an embodiment of the invention (c), whereby the injectors are at the trailing edge of the vane shape.

With a full-vane height, which is used in current FS injector shape (see FIG. 11(a)), there is only shear layer at a trailing edge of the vane (see FIG. 13(a)). To overcome this, a triangle or half-vane shape is proposed to let the flow change the side and enter the suction side.

There is no special rule with respect to vortex strength, as to which edge of the triangle is used as the leading edge facing the air. Whether the tip or the bottom of the triangle VG is facing the first or second (inner or outer) channel wall, might have an impact on the design of the fuel supply, and/or the cooling efficiency due to increased turbulence resp. cross-flow velocities downstream of the VGs. It might as well have an impact on fuel supply.

To realize the vorticity fields of the three types explained above, the following prototype shapes are possible (FIGS. 5 and 6).

Figure 5A:
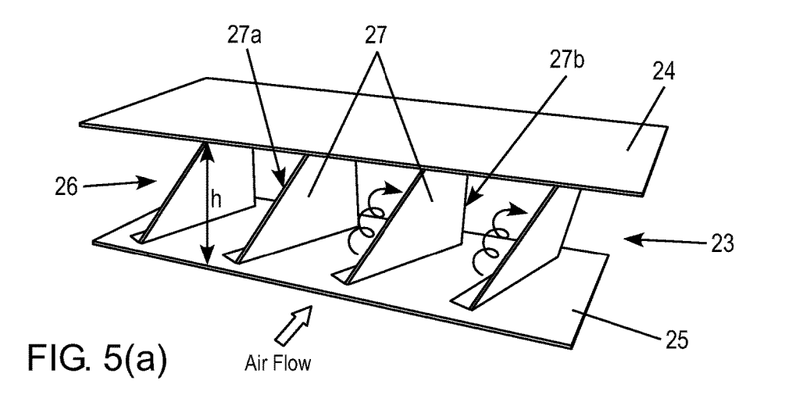
FIG. 5 a vortex generator arrangement with triangular vortex generators according to an embodiment of the invention with a long edge as leading edge (FIG. 5(a)) and a short edge as leading edge (FIG. 5(b))
Figure 5B:
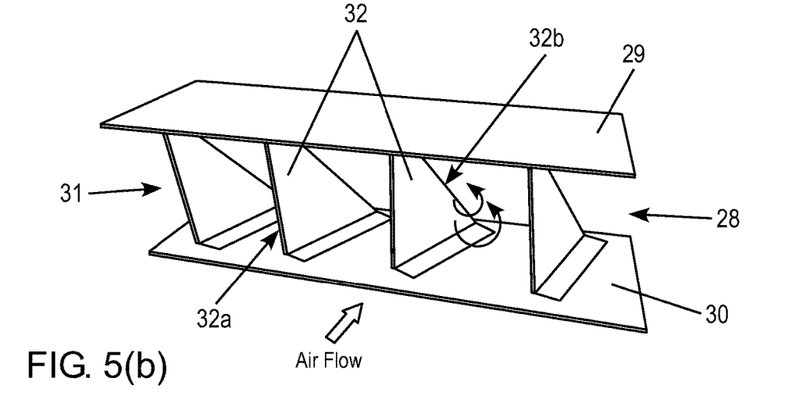

FIG. 5 shows pictures of two (prototype) devices (FIGS. 5(a) and (b)), which can induce co-rotating vortices.

The vortex generating arrangement 23 of FIG. 5(a) shows a section of a channel 26 between two parallel channel walls 24 and 25. The view is in air flow direction.

Between channel walls 24 and 25 four identical exemplary vortex generators 27 of right-angled triangular (half-vane) shape are arranged parallel to each other, but off-axis with the direction of air flow (see air-flow arrow). One of the legs of the triangular vortex generator 27 extends between and perpendicular to the channel walls 24 and 25. This leg is the trailing edge 27b of the half-vane. On the other hand, the long diagonal edge of the triangular vortex generator 27 is the leading edge 27a of the half-vane.

The vortex generating arrangement 28 of FIG. 5(b) shows a section of a channel 31 between two parallel channel walls 29 and 30. Again, the view is in air flow direction. Between channel walls 29 and 30 four identical exemplary vortex generators 32 of right-angled triangular (half-vane) shape are arranged parallel to each other, but off-axis with the direction of air flow (see air-flow arrow). One of the legs of the triangular vortex generator 32 extends between and perpendicular to the channel walls 29 and 30. This leg is now the leading edge 32 of the half-vane. On the other hand, the long diagonal edge of the triangular vortex generator 32 is the trailing edge 32b of the half-vane.

In both cases, each vortex generator 27 or 32 generates a single vortex, whereby all vortices are co-rotating (see FIG. 2).

Figure 6A:
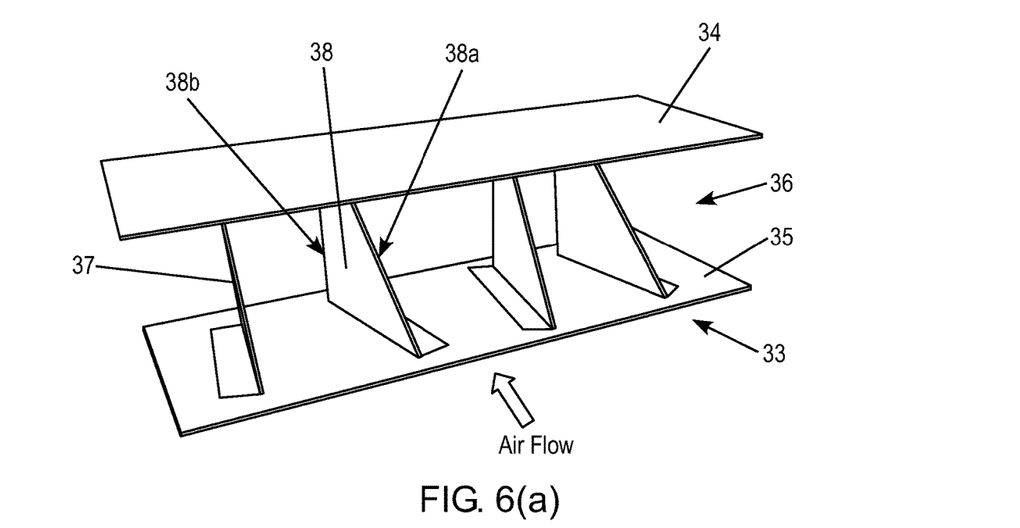
FIG. 6 a vortex generator arrangement with triangular vortex generators of pair wise different orientation according to another embodiment of the invention, with a long edge as leading edge (FIG. 6(a)) and a short edge as leading edge (FIG. 6(b))
Figure 6B:
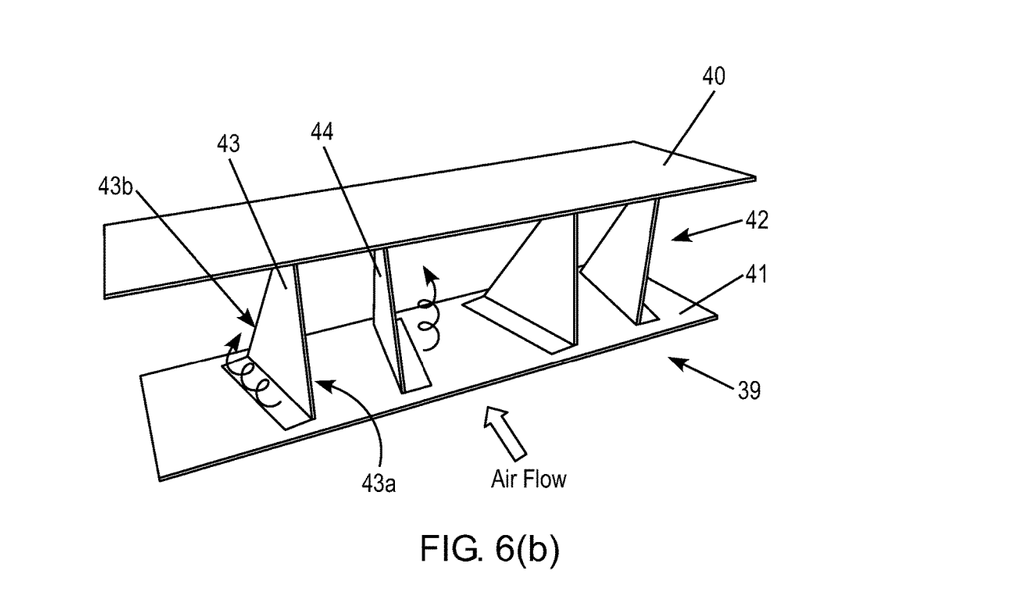

FIG. 6 shows pictures of two (prototype) devices (FIGS. 6(a) and (b)), which can induce counter-rotating vortices.

The vortex generating arrangement 33 of FIG. 6(a) shows a section of a channel 36 between two parallel channel walls 34 and 35. The view is in air flow direction. Between channel walls 34 and 35 four exemplary vortex generators 37, 38 of identical right-angled triangular (half-vane) shape but different orientation with respect to the air flow direction are arranged off-axis with the direction of air flow (see air-flow arrow). One of the legs of the triangular vortex generators 37, 38 extends between and perpendicular to the channel walls 34 and 35. This leg is the trailing edge 38b of the half-vane. On the other hand, the long diagonal edge of the triangular vortex generators 37, 38 is the leading edge 38a of the half-vane. The vortex generators 37, 38 are pair wise off-axis in opposite directions (as shown in FIG. 7(b)).

The vortex generating arrangement 39 of FIG. 6(b) shows a section of a channel 42 between two parallel channel walls 40 and 41. The view is in air flow direction. Between channel walls 40 and 41 four exemplary vortex generators 43, 44 of identical right-angled triangular (half-vane) shape but different orientation with respect to the air flow direction are arranged off-axis with the direction of air flow (see air-flow arrow). One of the legs of the triangular vortex generators 43, 44 extends between and perpendicular to the channel walls 40 and 41. This leg is the leading edge 43a of the half-vane. On the other hand, the long diagonal edge of the triangular vortex generators 43, 44 is the trailing edge 43b of the half-vane. The vortex generators 43, 44 are pair wise off-axis in opposite directions (equivalent to FIG. 7(b) with the air flow direction 77 reversed).

The hybrid configuration of co- and counter-rotating stream wise vorticity field can be achieved by combining the devices of FIG. 5 and FIG. 6.

Figure 7C:
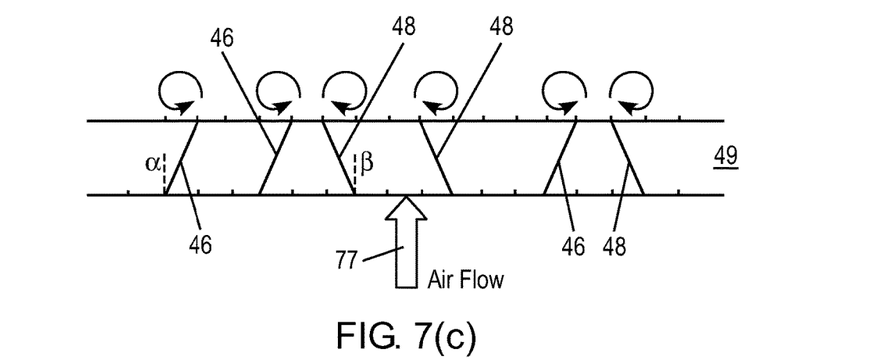

The top view of the three types (co-rotating, counter-rotating and hybrid) can be found in FIG. 7(a)-(c).

In co-rotating vortex generating arrangement 45 of FIG. 7(a) the half-vane vortex generators 46 have all the same orientation with respect to the direction of air flow 77, with identical off-axis angle α, thereby defining a pressure side 62 and suction side 61 for each half-vane.

In counter-rotating vortex generating arrangement 47 of FIG. 7(b) the half-vane vortex generators 46 and 48 (of one pair) have different orientations with respect to the direction of air flow 77, with opposite off-axis angles a and R.

In hybrid vortex generating arrangement 49 of FIG. 7(c) the half-vane vortex generators 46 and 48 have different orientations with respect to the direction of air flow 77, with opposite off-axis angles α and β. They are combined in a hybrid fashion either pair wise, or in a quadruple arrangement, or otherwise.

The geometries described in the previous section are limited for a channel of small channel height h (see FIG. 5(a)), which fits well to the flame sheet main stage.

Anyhow it is desirable to have a similar design suitable for a larger channel height. FIG. 8 shows various embodiments of a vortex generating arrangement according to the invention, which may be used for and extended to larger channel heights. The common principle of these embodiments is to have a stack of at least two half-vane vortex generators to bridge the height of a channel 51 between channel walls 50 and 52. In each case, one side of the stacked triangular elements extends perpendicular to the (parallel) channel walls 50 and 52.

Figure 8A:
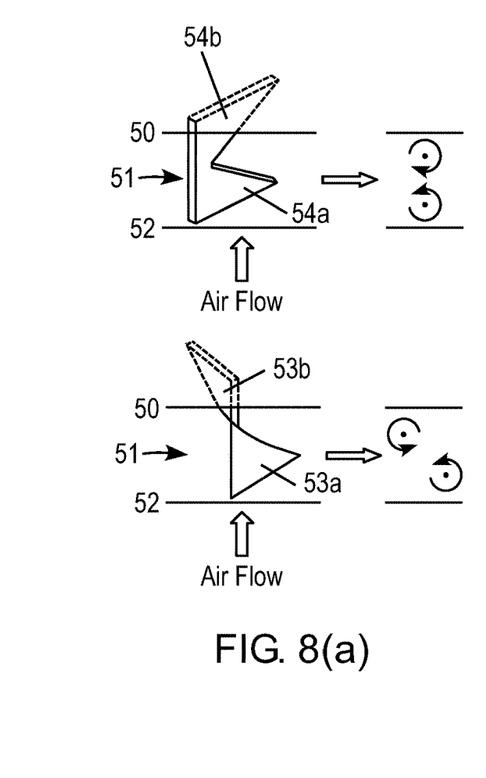
FIG. 8 various embodiments (a) to (c) of the invention with two vortex generators stacked on top of each other.

In FIG. 8(a), in the lower part, two right-angled triangular vortex generators 53a and 53b with opposite off-axis orientation are stacked with one of their legs, whereby the other legs are parallel to the channel walls 50, 52. In the upper part of FIG. 8(a), the triangular vortex generators 54a and 54b have the same orientation, but are arranged with mirror symmetry regarding a medium plane between the channel walls 50 and 52. The corresponding vortices are shown on the right side of each figure.

Figure 8B:
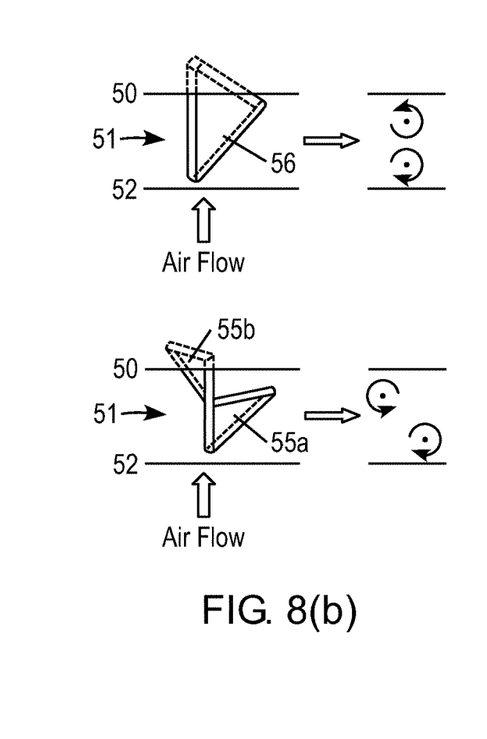

In FIG. 8(b), in the lower part, two right-angled triangular vortex generators 55a and 55b are stacked with one of their legs, similar to the lower part of FIG. 8(a). The other legs of both vortex generators 55a and 55b are in this case located on the upper side of the half-vanes. In the upper part of FIG. 8(b), there is only one equal-sided triangular vortex generator 56, which may be imagined as a combination of two right-angled triangles of half height.

Figure 8C:
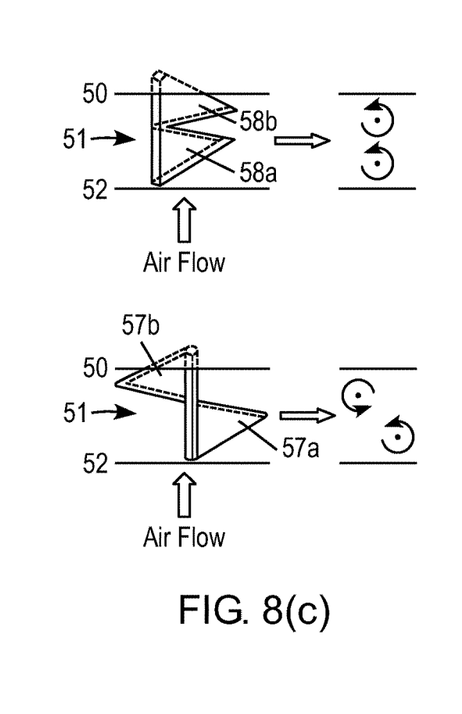

In FIG. 8(c), in the lower part, two equal-sided triangular vortex generators 57a and 57b with opposite off-axis orientation are stacked. In the upper part of FIG. 8(c), the two equal-sided triangular vortex generators 58a and 58b have the same orientation.

Simple designs might include a stack of two half-vane VGs (FIG. 8), while designs with even more half-vane VGs might bridge even more channel height. Embodiments of such designs are not shown, but can be based on those given in FIG. 8.

In these variants not all vortex generators necessarily need to have the same size, fuel injection location and/or off-axis (inclination) angle.

In the sketches shown in FIG. 8 the vortex structures are shown as if the leading edge is always a short edge of the triangular half-vane (see FIG. 5(b) or 6(b)). Instead of this the flow can come as well from the other side (see FIG. 5(a) or 6(a)).

A fuel injector location should define where the fuel particles can enter the vorticity field generated by the vortex generating arrangement. Typically, the vorticity field is strong at the suction side of the vortex generators. The region close to the trailing edge is where two counter-rotating vortices meet. The injection location may comprise either holes or slots.

FIGS. 9 and 10 show, as hatched areas, locations, where the injection may advantageously take place. The regions shown only represent the injection location but not the injector shape itself.

Figure 9A:
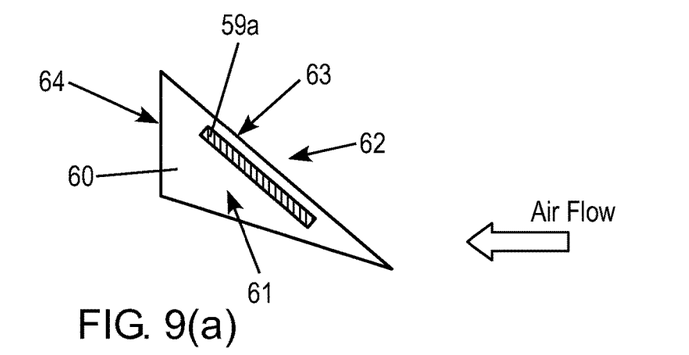
FIG. 9 three possible injector locations (a), (b) and (c) in a vortex generator configuration according to an embodiment of the invention, wherein the longest edge is the leading edge.
Figure 9B:
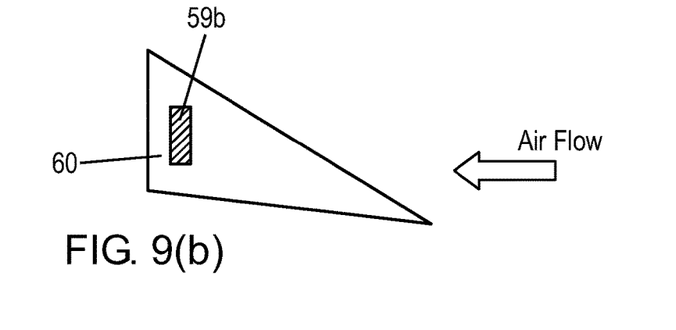
Figure 9C:
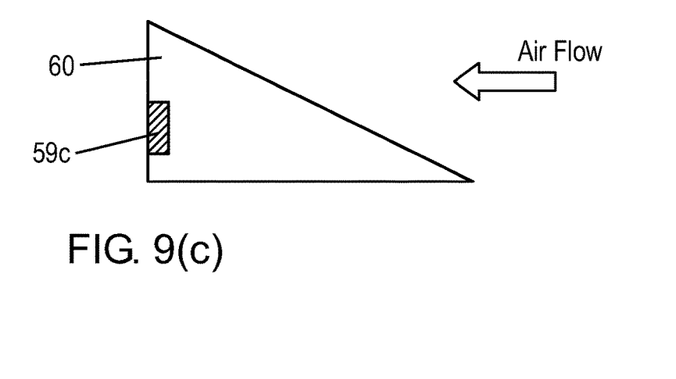

Therefore, with the longest edge as leading edge 63 (or the vertical edge or leg as the trailing edge 64), the fuel injection location may be defined at a right-angled triangular vortex generator 60 as follows (see FIG. 9):

1. Injector location 59*a* near the longest edge (63) on the suction side 61 (FIG. 9(*a*));
2. Injector location 59*b* near the trailing edge 64 on the suction side 61 (FIG. 9(*b*)); and
3. Injector location 59*c* directly at the trailing edge 64 (FIG. 9(*c*)).

Figure 10A:
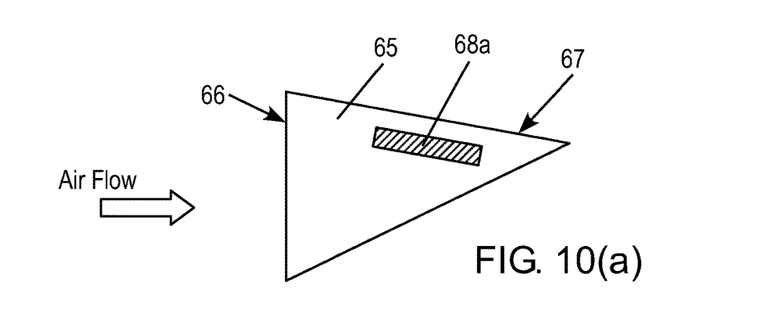
FIG. 10 two possible injector locations (a) and (b) in a vortex generator configuration according to an embodiment of the invention, wherein a leg of the right-angled triangle is the leading edge.
Figure 10B:
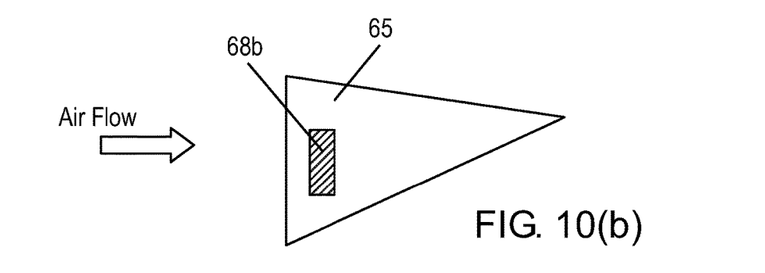

With not the longest edge as leading edge 66 of a right-angled triangular vortex generator 65 (FIG. 10), the fuel injection location can be chosen as follows:

1. Injector location 68*a* near the longest edge (67) on the suction side (FIG. 10(*a*)); and
2. Injector location 68*b* near the leading edge 66 on the suction side (FIG. 10(*b*)).

The fuel supply for the half-vane design may still use the current fuel supply method for FS main injector.

Figure 11B:
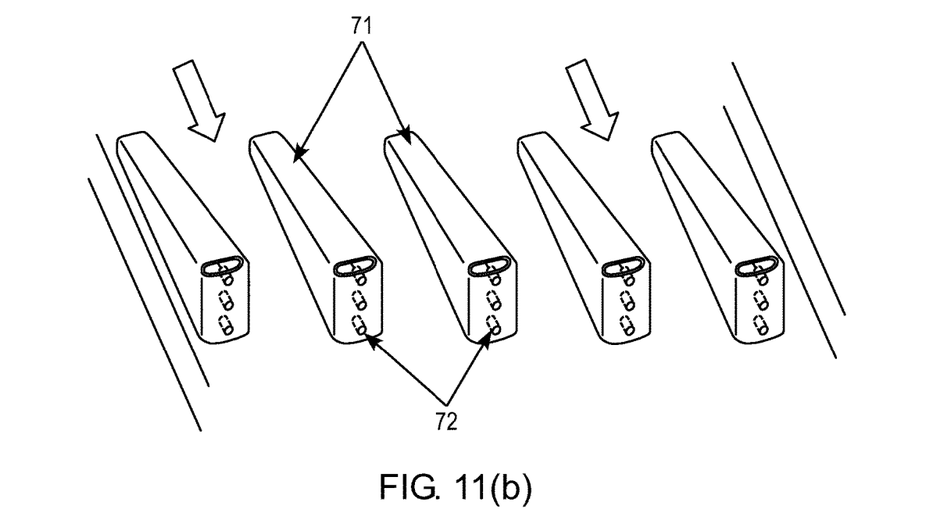
Figure 11C:
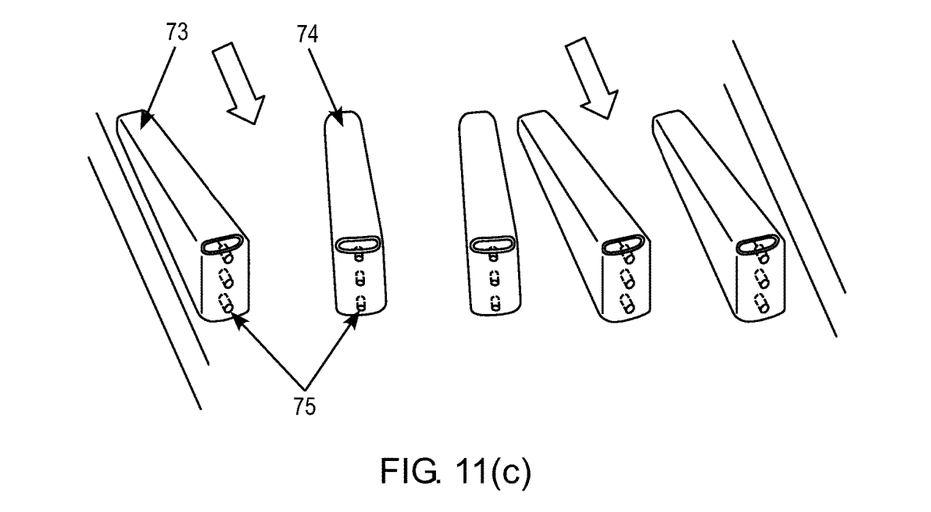

To represent the concept of the present "half vane" configuration, a comparison of the geometry of the original FS main "full-vane" injector (FIG. 11(*a*)) and proposed two embodiments of the half-vane injector (standard version in FIG. 11(*b*) and invert version in FIG. 11(*c*)) are shown in FIG. 11 in a perspective view, whereby the main full-vane 69 has a plurality of fuel nozzle 70 at its trailing edge.

The standard half vane injector (71 in FIG. 11(*b*)) has only cut away the leading half of the reference FS main injector. The invert version of the half vane injector (FIG. 11(*c*)) differs by a change of the orientation (direction) of two injectors. It can be shown that the mixing is clearly improved in the half vane variants (b and c) compared with original full vane version (a).

Figure 12A:
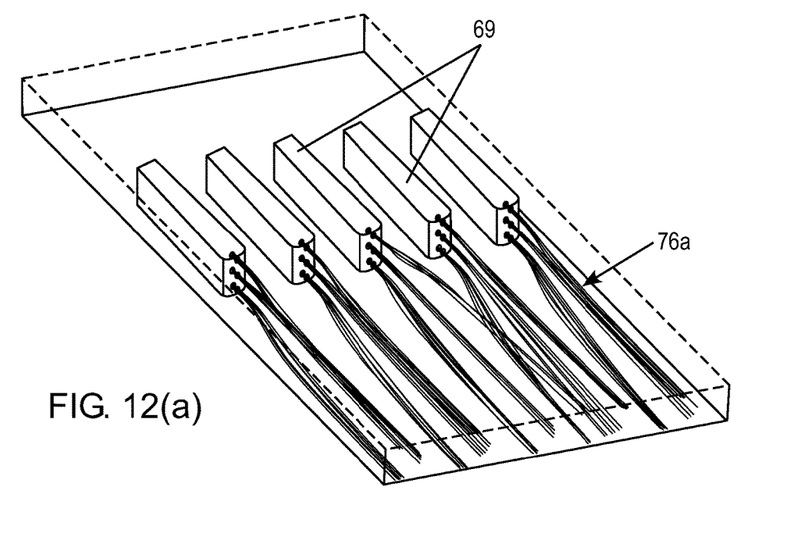
FIG. 12 streamlines of fuel injection for the three injector variants shown in FIG. 11(a)-(c)
Figure 12B:
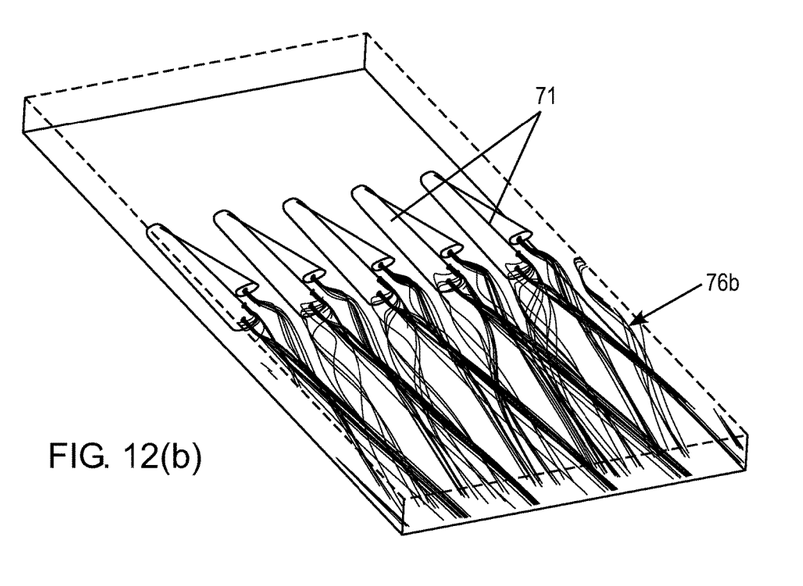
Figure 12C:
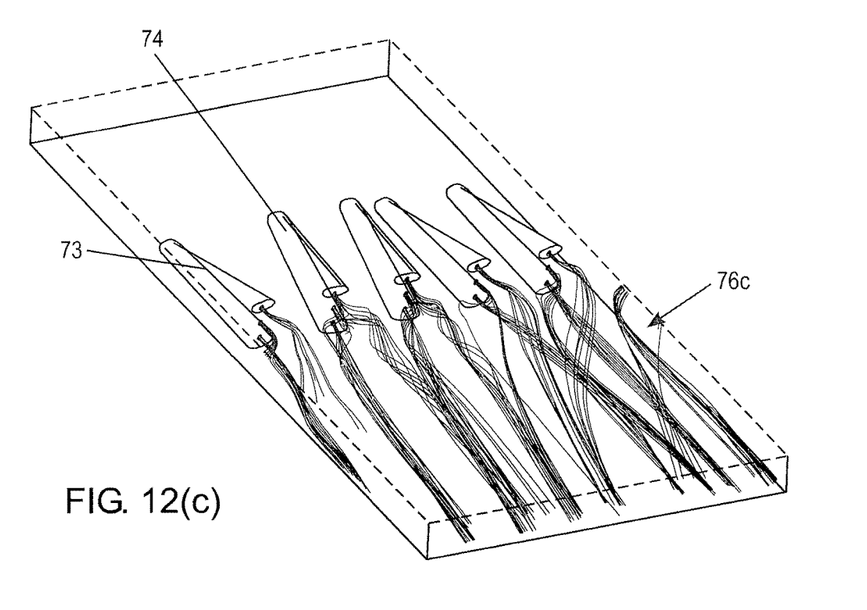

To explain the reason for this improvement, the streamlines of fuel injection (76*a-c* in FIG. 12 (*a*)-(*c*)) prove that, with the half-vane versions, the fuel streamlines 76*b* and 76*c* are able to cross each other. To have the fuel streamlines crossing each other is the key for improving mixing.

Another improvement of the half-vane injector according to the invention is to have stream wise vorticity as shown in FIG. 2.

The half-vane vortex generators can induce the circulation in the channel. With standard half-vane shape, the circulation has patterns near the top channel wall, which can be interpreted as a lifting of the stream wise vortices to the top. With the invert half-vane version, there is also a secondary circulation near the bottom wall, which can be assumed to improve the mixing near the bottom wall of the channel.

Figure 13:
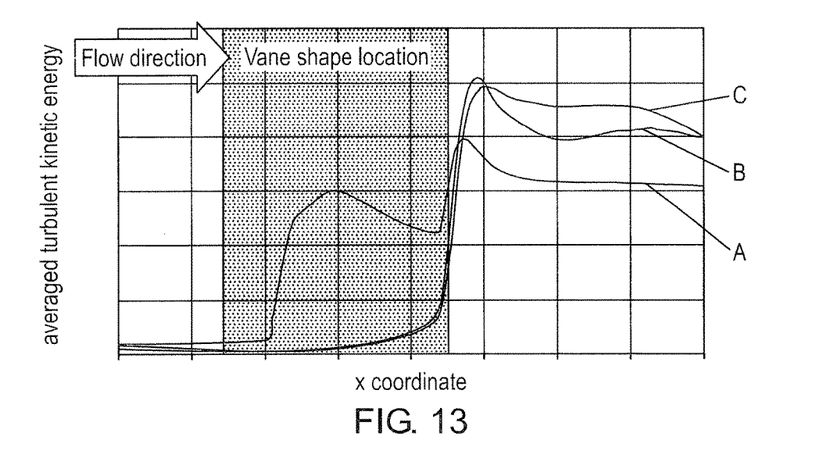
FIG. 13 turbulence kinetic energy compared for the three injector variants shown in FIG. 11(a)-(c).

As shown in FIG. 13, the turbulence level (turbulent kinetic energy, TKE) in the vane shape location (grey area) is lower in both half-vane variants (Curves B and C) compared with original FS vane design (curve A). This is because of the blockage of full-vane shape and also because of the wake induced by attack of angle for the full-vane. With half-vane shape, the flow will cross the vane shape with an attack angle. Downstream of the injector plane, the TKE in both half-vane variants are higher than that in the original FS full vane design. The higher TKE helps in mixing air and fuel.

In summary, CFD results clearly prove that, with the proposed half-vane design, the mixing quality can be improved compared with the original full-vane shape injectors. The reason for this improvement is the large scale circulation in the channel and also the crossing of the individual fuel streamlines.

LIST OF REFERENCE NUMERALS

10 gas turbine (e.g. GT26)
11 rotor
11*a* machine axis
12 casing
13 compressor
14 combustor
15 high pressure turbine
16 combustor
17 low pressure turbine
18,19 channel wall
20 channel
21,22 vortex
21*a,b* swirling flow
21*c* vortex
22*a,b* vortex
23,28,33,39 vortex generating arrangement
24,25,29,30 channel wall
26,31 channel
27,32 vortex generator
27*a*,32*a* leading edge
27*b*,32*b* trailing edge
34,35,40,41 channel wall
36,42 channel
37,38,43,44 vortex generator
38*a*,43*a* leading edge
38*b*,43*b* trailing edge
45,47,49 vortex generating arrangement
46,48 vortex generator
50,52 channel wall
51 channel
53*a,b*,54*a,b* vortex generator
55*a,b*,56 vortex generator
57*a,b*,58*a,b* vortex generator
59*a-c*,68*a,b* injector location
60,65 vortex generator
61 suction side
62 pressure side
63,66 leading edge
64,67 trailing edge
69 main injector
70,72,75 fuel nozzle
71,73,74 half vane injector
76*a-c* fuel streamline
77 direction of air flow (in the channel)
A,B,C curve
h height (channel)
α,β angle (between air flow direction and vortex generator plane)

The invention claimed is:

1. A vortex generating arrangement, for a pre-mixing burner of a gas turbine, comprising:
   an air conducting channel of predetermined height extending between two essentially parallel channel walls and having a predetermined direction of air flow; and
   a plurality of vortex generators arranged in said channel also having the predetermined height and extending between the two essentially parallel channel walls, wherein:
   said vortex generators each having a shape of a triangular plate, arranged essentially perpendicular to said channel walls and oriented relative to said direction of air flow with a predetermined off-axis angle ($\alpha$, $\beta$) $\neq 0°$, and a first side of said triangular plate is oriented perpendicular to said channel walls, each of said vortex generators configured to form only a single vortex, and wherein a gap exists between each of the plurality of vortex generators from one wall to another wall of the two essentially parallel channel walls.

2. The vortex generating arrangement as claimed in claim 1, wherein said vortex generators are individually arranged in said channel.

3. The vortex generating arrangement as claimed in claim 1,
wherein said vortex generators are arranged in said channel in groups.

4. The vortex generating arrangement as claimed in claim 1,
wherein each of said first side of the triangular plate is arranged upstream with respect to said direction of air flow, thereby being a leading edge of a respective one of the plurality of vortex generators.

5. The vortex generating arrangement as claimed in claim 1,
wherein each of said first side of the triangular plate is arranged downstream with respect to said direction of air flow, thereby being a trailing edge of a respective one of the plurality of vortex generators.

6. The vortex generating arrangement as claimed in claim 1,
wherein said plurality of vortex generators each have a shape of a right-angled triangular plate, and that said first side is a leg of said right-angled triangular plate.

7. The vortex generating arrangement as claimed in claim 1,
wherein all of the plurality of vortex generators of said arrangement have a same orientation with respect to said direction of air flow.

8. The vortex generating arrangement as claimed in claim 1,
wherein the plurality of vortex generators of said arrangement have different orientations with respect to said direction of air flow.

9. The vortex generating arrangement as claimed in claim 8,
wherein the plurality of vortex generators of said arrangement have two different orientations with respect to said direction of air flow with a positive and a negative predetermined off-axis angle.

10. The vortex generating arrangement as claimed in claim 1,
comprising an injector for injecting a fuel into an air stream passing said vortex generators is provided at said vortex generators.

11. The vortex generating arrangement as claimed in claim 10,
wherein said injector is positioned at a specific injector location at said vortex generators.

12. The vortex generating arrangement as claimed in claim 11,
wherein said specific injector location is located at a trailing edge of said vortex generators.

13. The vortex generating arrangement as claimed in claim 11,
wherein said specific injector location is located at a leading edge of said vortex generators.

14. A gas turbine with a premixing burner comprising:
the vortex generating arrangement, wherein said vortex generating arrangement is an arrangement according to claim 1.

15. The vortex generating arrangement as claimed in claim 1,
wherein said first side of each said triangular plate is arranged upstream with respect to said direction of air flow, thereby being a leading edge of a respective one of the plurality of vortex generators, wherein at least one first vortex generator of the plurality of vortex generators is configured to impart a co-rotating vortex and at least one second vortex generator of the plurality of vortex generators is configured to impart a counter-rotating vortice.

* * * * *